United States Patent [19]

Lenk

[11] Patent Number: 4,609,902

[45] Date of Patent: Sep. 2, 1986

[54] ARRESTER SUPPORT AND DISCONNECTOR STRUCTURE

[75] Inventor: Dennis W. Lenk, Medina, Ohio

[73] Assignee: Harvey Hubbell Incorporated, Orange, Conn.

[21] Appl. No.: 783,524

[22] Filed: Oct. 3, 1985

[51] Int. Cl.⁴ ........................ H01H 39/00; H02H 9/06

[52] U.S. Cl. ........................................ 337/30; 337/28; 361/124

[58] Field of Search .................... 337/30, 28; 361/124, 361/125, 131

[56] References Cited

U.S. PATENT DOCUMENTS

| | | | |
|---|---|---|---|
| 2,498,120 | 2/1950 | Fox | 173/324 |
| 2,504,438 | 4/1950 | McFarlin . | |
| 2,551,858 | 5/1951 | Stoelting et al. . | |
| 2,957,967 | 10/1960 | MacRae . | |
| 2,989,608 | 6/1961 | Hicks . | |
| 3,100,246 | 8/1963 | Riley . | |
| 3,239,631 | 3/1966 | Snell, Jr. | 337/30 |
| 3,588,773 | 6/1971 | Carothers | 337/30 |
| 4,503,414 | 3/1985 | Sykes et al. | 337/31 |

*Primary Examiner*—Harold Broome

*Attorney, Agent, or Firm*—Jerry M. Presson; Walter C. Farley

[57] ABSTRACT

An arrester support and disconnector structure enclosed, in one embodiment, a cylindrical housing having a lower wall with a weakened zone. Electrically conductive members extend through the upper and lower walls of the housing and make electrical connection with the arrester and a ground wire, respectively. Between the conductive members is an explosive charge which is detonated by the passage of excess current, thereby removing the lower member. The cylindrical body has an exterior recess to receive a supporting strap. In another embodiment, the support structure includes an elongated nonconductive body mounted at one end to a conventional support bracket. At the other end an upper surface supports an arrester and a housing below that surface contains the disconnector, again containing upper and lower conductive members with an explosive charge therebetween. The housing surrounding the conductive members has a weakened zone which is separated when the charge is detonated by excessive current. After detonation of the explosive charge which removes the arrester ground lead in each embodiment, the arrester will still be mechanically supported by the remaining intact section of nonconductive bracket, the contour of which provides sufficient insulating strength between the energized base of the failed arrester and the grounded bracket to allow the arrester to remain energized without causing a system outage.

11 Claims, 5 Drawing Figures

ARRESTER SUPPORT AND DISCONNECTOR STRUCTURE

This invention relates to an improved support structure for a surge arrester and, particularly, to a support structure which includes a ground wire disconnector.

BACKGROUND OF THE INVENTION

Generally speaking, the function of a surge arrester is to carry to ground excessive current on a power line resulting from lightning, sudden changes in the source or load voltage or other transient phenomena. Thus, the arrester usually has a current path to ground which includes resistance elements having special, nonlinear characteristics so that the surge is dissipated without damage to equipment on the line and so that service can continue after the transient is gone.

If a transient occurs which is too large or too long-lasting for the arrester to handle, not all of the energy can be dissipated and the arrester may then fail. It is also possible for the arrester to fail as the result of other causes such as the gradual deterioration of the resistance elements. In this context, "failure" can be defined as the breakdown of components in the arrester such that an uncontrolled or insufficiently controlled current path is established through the arrester, usually from the power line to ground.

When failure occurs, the arrester is no longer capable of performing any useful function and it is desirable to remove it from the circuit to avoid opening other circuit breakers in the system. For this purpose, arresters have been provided with disconnectors which permanently separate the ground line from the arrester. Such disconnectors include an explosive charge or other gas generating substance activated by the heat of a spark in a gap in the ground circuit. The excessive current creates enough heat to detonate the charge or otherwise generate gases the expansion of which blow a portion of the device out along a line which is intentionally constructed to be weaker than the rest of the structure, thereby physically separating the ground line from the arrester. Examples of arresters having such connectors are shown in the following U.S. Pat. Nos.:

2,957,967, MacRae;
2,989,608, Hicks;
3,100,246, Riley;
4,503,414, Sykes et al.

In the prior art the disconnector is constructed so as to be, or to become, part of the arrester structure itself. The arrester is then supported by a separate apparatus such as a "bellyband" or bracket. The external housing leakage distance between the energized bottom end of the electrically failed arrester which is still mechanically intact and the sometimes electrically grounded bellyband bracket is designed to be sufficiently long to allow the failed arrester to remain energized without locking out the electrical system.

SUMMARY OF THE INVENTION

An object of the present invention is to provide an improved support arrangement for an arrester in which the disconnector is part of the support structure whereby various kinds of arresters can be attached to the support structure and the disconnector as a unit.

Briefly described, in one aspect the invention includes an arrester support and disconnector structure comprising a housing of electrical insulating material having upper and lower walls and an interior chamber. A first electrically conductive member extends through the upper wall, the first member having threaded means at the upper end thereof for electrical and mechanical connection to an arrester. A second conductive member extends through the lower wall and has means for connection to a ground wire, the upper end of the second member being spaced from the lower end of the first member. An explosive charge is positioned between the first and second members with an air gap between the charge and one of those members. The lower wall has a frangible, weakened zone surrounding the second member so that detonation of the charge fractures the lower wall at the zone and separates the second conductive member with the ground lead from the remainder of the housing. The exterior of the housing has a recess and a support band surrounds the housing in the recess for supporting the housing and arrester mounted thereon.

In another aspect, the invention includes an arrester support and disconnector structure comprising an elongated body of electrical insulating material with means at one end of the body for attachment to a mounting device so that the body lies in a generally horizontal plane. At the other end of the body is a flat, upwardly facing surface for supporting an arrester. A generally cup-shaped disconnector housing is unitarily formed on the body at the other end and extends downwardly from the surface, the housing having an annular, weakened frangible zone formed therein. A first electrically conductive member having threaded means for electrical and mechanical connection to an arrester supported on the flat surface is mounted in the housing above the frangible zone. A second electrically conductive member is fixedly attached in the lower end of the housing below the frangible zone, the second member having means below the housing for connection to a ground lead. An explosive charge is positioned between the first and second members with an air gap between the charge and one of the members so that detonation of the charge fractures the housing along the zone and separates the second member and the ground lead from the remainder of the housing.

BRIEF DESCRIPTION OF THE DRAWINGS

In order to impart full understanding of the manner in which these and other objectives are attained in accordance with the invention, particularly advantageous embodiments thereof will be described with reference to the accompanying drawings, which form a part of the specification and wherein.

DESCRIPTION OF THE PREFERRED EMBODIMENTS

Figure 1:
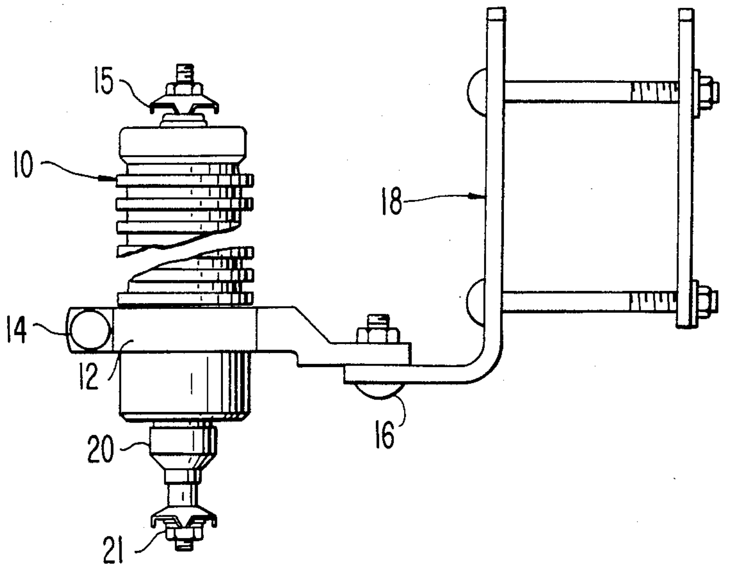
FIG. 1. PRIOR ART
FIG. 1 is a side elevation of a prior art arrester and disconnect mechanism mounted on a standard support bracket.

As shown in FIG. 1, the prior art form of structure includes an arrester indicated generally at 10 which has a recess near one end to receive a support strap 12 which is commonly referred to as a "bellyband". The strap is commonly attached to the arrester housing by threaded fastener 14. The "bellyband" is attached by a threaded fastener such as a bolt 16 to a standard bracket indicated generally at 18. Bracket 18 is of a type which is generally referred to as a NEMA bracket and is a standard type recommended for use by the National Electrical Manufacturers Association for connecting arresters to distribution and riser poles.

Arrester 10 has connection means 15 at the upper end for connection to a power line and has a disconnector 20 at the lower end with a threaded stud 21 provided for connection to a ground wire.

After an arrester has failed and disconnector 20 has operated to separate stud 21 and the ground wire from the arrester, the arrester is still supported by the bracket and bellyband and the bottom or base end of the arrester is still energized with high voltage. It is necessary to avoid creation of a conductive path between the base and the grounded bracket in order to avoid system outage. Historically, the insulating distance to prevent formation of this path has been provided by the porcelain housing leakage distance between the bottom edge of the bracket and the arrester ground terminal.

The structure of the present invention incorporates the disconnector in an advantageous way in the support structure. In the embodiment shown in FIG. 2, the support structure includes a generally cylindrical housing 25 which is made of an electrically non-conductive material such as a polymeric material. The housing has an upper wall 27, a lower wall 28 and a cylindrical side wall 30, the exterior of which is formed with a recess so that a "bellyband" 32 or similar restraining strap can extend around and support the housing. The support strap 32 can then be connected to a bracket such as bracket 18. Upper wall 27 extends radially outwardly somewhat beyond side wall 30 to form an extended rim 29 which greatly increases the leakage path length between the bellyband and the arrester ground terminal.

Upper wall 27 also has a central boss extending inwardly into the interior chamber of the housing, the boss having a central bore which receives an electrically conductive member 36. Member 36 has an externally threaded end portion 37 to which an arrester 38 can be electrically and mechanically connected. Conductive member 36 is fixedly attached in the opening in boss 34 as by adhesive bonding. As will be recognized, member 36 can also be provided with a female threaded opening to accommodate arresters having a threaded male connecting member.

The upper wall and side wall of the housing are unitarily formed in a single piece. Annular projections 38, 39 depend from wall 27 into the interior chamber of the housing to provide a lengthening surface to electrically insulate the energized arrester base terminal of a failed arrester from the electrically conducting, possibly grounded, bellyband bracket. The extended rim section 29 provides a similar insulating function on the exterior surface of the housing.

The lower wall 28 of the housing is formed as a separate piece and is attached, as by adhesively bonding, to the lower edges of the side wall at 40 so that the lower wall is then fixedly attached and, essentially, a structural part of the remainder of the housing. A second, lower conductive member 42 is fixedly mounted in the center of wall 28, member 42 having an externally threaded stud 43 for attachment of a ground wire in the conventional fashion.

The opposite surfaces of wall 28 taper toward each other from the junction of the wall with member 42 radially outwardly to an annular region 44 which is thinner and therefore significantly weaker than the remainder of wall 28 and also weaker than the adjacent portions of wall 30. Region 44 can be regarded as a frangible zone which is breakable upon the imposition of a sudden force of known magnitude. That force is supplied by an explosive charge within the housing activated by the heat of an arc in the event of failure of the arrester 38 and excessive current flow through the components within housing 25 to ground.

Figure 2:
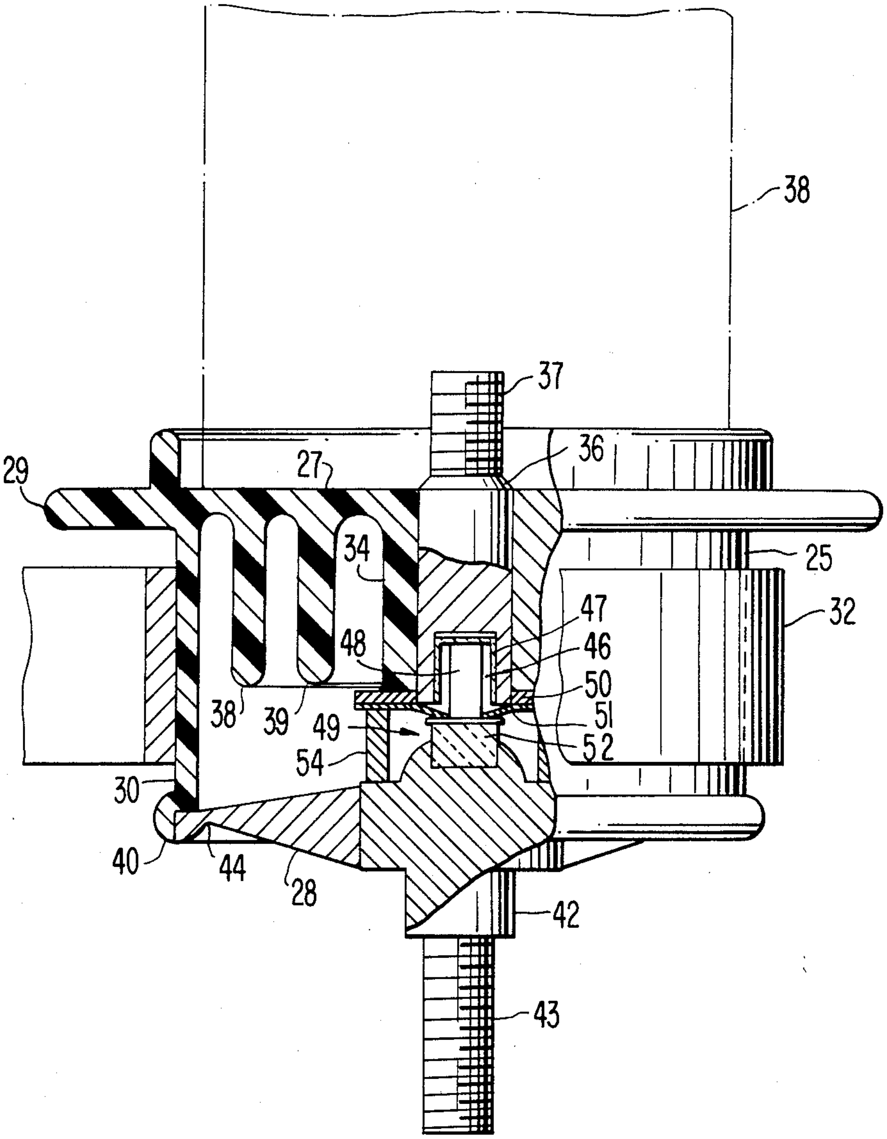
FIG. 2 is a side elevation, in partial section, of a first embodiment of a structure in accordance with the invention.

The provision and arrangement of an explosive charge or other gas generating mechanism within the housing can take a number of different forms, one of which will now be described. As shown in FIG. 2, conductive member 36 has a recess 46 extending upwardly from the lower end thereof to receive an explosive charge 48. The explosive charge 48 is electrically insulated from the recess 46 by a nonconductive cup-shaped insert 47 surrounding the explosive charge. The lower end of charge 48 has an enlarged head. At the lower end of member 36 is an electrically conductive flat washer 50 and a spring washer 51 which engages the enlarged head of charge 48 and holds the charge against a body of nonconductive material 52 which can be porcelain. Porcelain body 52 fits in a recess in the upper end of conductive member 42. A cylindrical, tubular grading member 54 surrounds porcelain body 52 and extends between an upper surface of member 42 and the conductive members which are in electrically conducting relationship with member 36. The function of grading member 54 is to carry surface currents during normal operation of the apparatus.

When failure occurs, excessive current passing through members 36 and 42 through grading member 54 as well as washers 50 and 51 exceeds the level which can be handled in this fashion. Current then attempts to bridge the gap between member 42 and explosive charge 48, creating an arc in gap 49 which detonates charge 48, causing rapid expansion of gases within the housing which fractures wall 28 along line 44, separating the majority of the wall along with member 42 and stud 43 from the remainder of the housing and allowing the ground wire to be completely disconnected from the apparatus. Thereafter, everything in the housing below member 36 is blown out.

Figure 5:
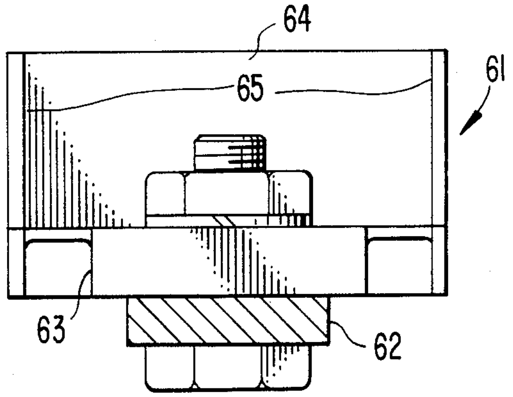
FIG. 5 is an end elevation of the apparatus of FIGS. 3 and 4.
Figure 3:
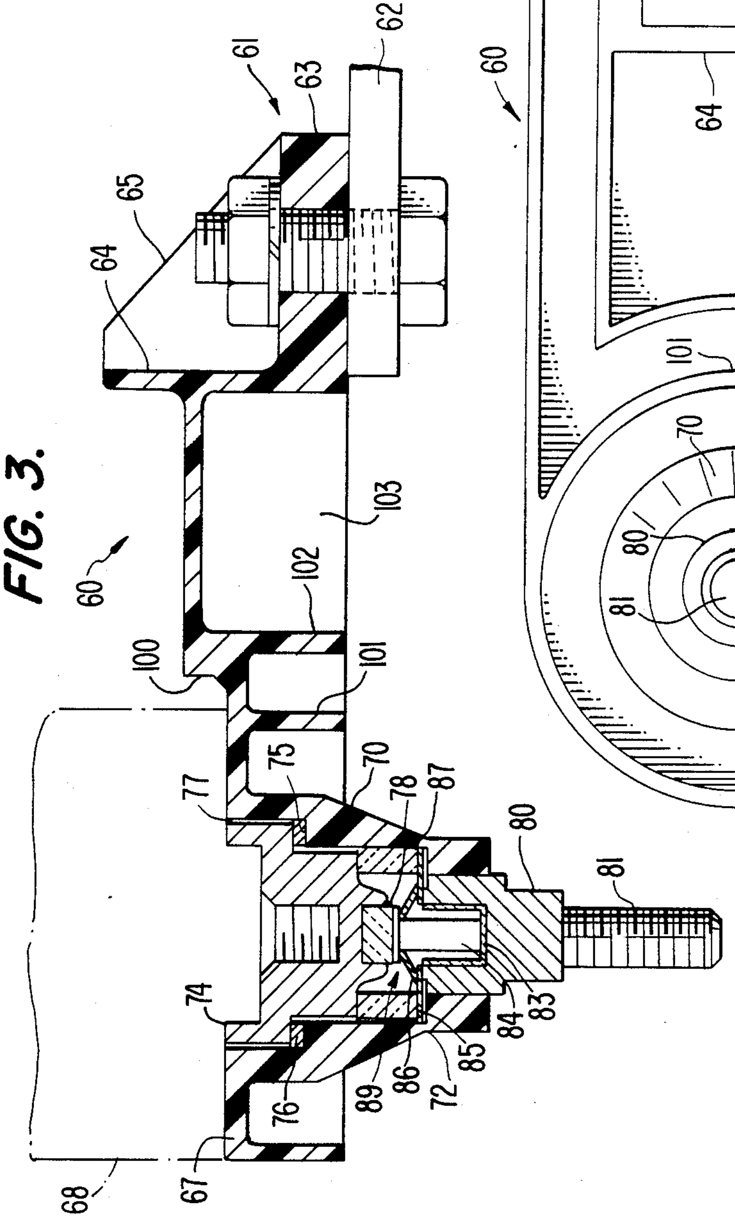
FIG. 3 is a side elevation, in section, of a second embodiment of an apparatus in accordance with the invention.
Figure 4:
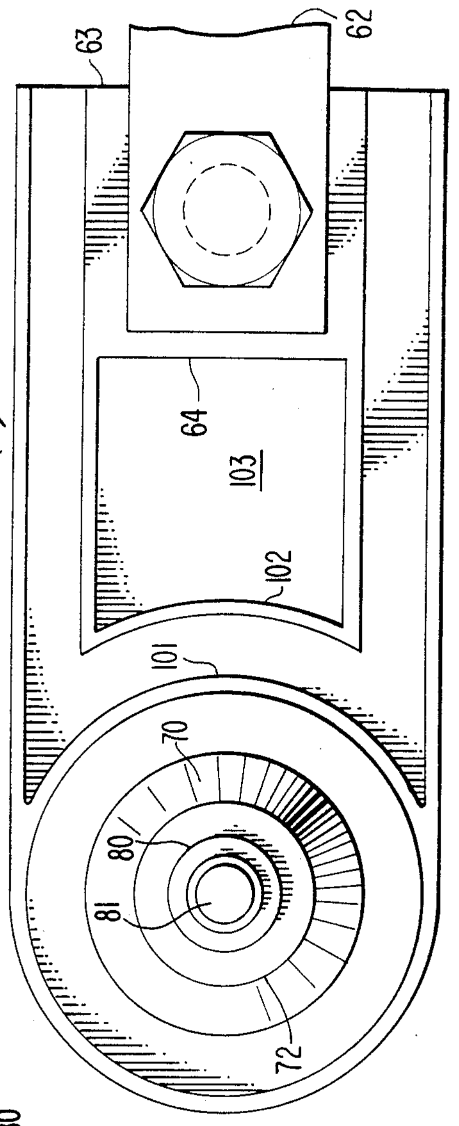
FIG. 4 is a bottom plan view of the apparatus of FIG. 3.

A further embodiment of an apparatus in accordance with the invention is shown in FIGS. 3, 4, and 5. The mounting structure illustrated therein includes an elongated body 60 of electrically nonconductive material having means 61 at one end for attachment to the end 62 of a conventional mounting bracket such as bracket 18 illustrated in FIG. 1. The attachment means includes a mounting plate 63, an upstanding transverse wall 64 and side walls 65, only one of which is visible in FIG. 3, which act as rigidifying walls to interconnect plate 63 with wall 64. At the other end of body 60 is an upwardly facing flat surface 67 on which can rest an arrester 68. As will be recognized, the terms "upper" and "lower" refer to the orientation of the body when it is in its normally mounted position as illustrated in FIG. 3. At the left end of body 60 is a housing 70 which extends downwardly below surface 67 and which constitutes a housing for the disconnector apparatus. Housing 70 is unitarily formed on body 60 and is generally conical in shape, having an internal recess, the conical outer surface and inner recess defining a thinned, frangible zone 72 which is significantly weaker than the remainder of the housing.

An electrically conductive member 74 is received within housing 70. An annular shoulder 75 supports a washer 76 on which a flange of member 74 rests. Conductive member 74 can be fastened in the recess by mechanical threads or by an adhesive bonding material indicated at 77.

The lower end of member 74 has a recess which receives a nonconductive body 78 of a material such as porcelain. At the lower end of housing 70 is a second conductive member 80 which has a downwardly extending externally threaded stud 81 for the attachment of a ground wire. The upper end of member 80 has a downwardly extending recess which receives an insulating cup 83 and an explosive charge 84, the upper end of which extends above member 80 and has an enlarged head which contacts the lower surface of body 78. Charge 84 is held upwardly against the lower surface of body 78 by a spring washer 86 and a conducting washer 85 on which a cylindrical, tubular grading member 87 rests. Spring washer 86 holds charge 84 in a position so that a gap is formed around the upper end of the charge.

As in the embodiment of FIG. 1, if excessive current flows through the disconnector from arrester 68 to the ground wire connected to stud 81, an arc is produced in the gap 89 above the charge, thereby detonating the charge and causing housing 70 to fracture along line 72, separating conductive member 80 and the ground wire from the remainder of the apparatus.

When the ground stud and wire is removed and the arrester remains energized, the path between the base of the energized arrester and other grounded locations becomes important. Since bracket 62 will commonly be grounded, the configuration of the upper and lower surfaces of body 60 becomes important. Thus, the upper surface of the body includes a step 100 and upstanding wall 64 which constitute path lengthening and insulating barriers between the arrester and grounded, conductive components. On the bottom of body 60, transverse walls 101 and 102 followed by a recess 103 perform a similar function. Note also that after the housing is separated along line 72, the remaining conductive component is within the hollow recess formed by the remainder of housing 70. Thus, as discussed in connection with FIG. 2, the contour of the insulating surfaces on both the top and bottom sides of the bracket 60 between the failed arrester base end and the grounded NEMA bracket 62, is designed to electrically insulate those components, preventing permanent tripout of the attached power system.

While certain advantageous embodiments have been chosen to illustrate the invention it will be understood by those skilled in the art that various changes and modifications can be made therein without departing from the scope of the invention as defined in the appended claims.

What is claimed is:

1. An arrester support and disconnector structure comprising a housing of electrical insulating material having upper and lower walls and an interior chamber;

a first electrically conductive member extending through said upper wall, said first member having threaded means at the upper end thereof for electrical and mechanical connection to an arrester;

a second electrically conductive member extending through said lower wall, said second member having means for connection to a ground lead, the upper end of said second member being spaced from the lower end of said first member;

an explosive charge positioned between said first and second members with an air gap between said charge and one of said members;

means in said lower wall defining a frangible, weakened zone surrounding said second member so that detonation of said charge fractures said lower wall at said zone and separates said second conductive member with the ground lead from the remainder of said housing;

means defining a recess around said housing; and a support band surrounding said housing in said recess for supporting said housing and an arrester thereon.

2. A structure according to claim 1 wherein said housing is in the shape of a right circular cylinder and said upper wall includes a plurality of radially spaced, annular insulating ribs extending downwardly within said chamber and surrounding said first member, providing insulating path length between the energized base of a failed arrester on said support and said band.

3. A structure according to claim 2 wherein said first member includes a recess extending upwardly into the end of said first member for receiving said charge, the upper end of said charge and the inner end of said recess defining said air gap.

4. A structure according to claim 3 and further including an insulating body supported on the upper end of said second member and supporting said charge; and a cylindrical grading member surrounding said insulating body and electrically interconnecting said first and second member.

5. A structure according to claim 4 wherein said first member is bonded to said upper wall and said second member is bonded to said second wall.

6. A structure according to claim 5 wherein said lower wall is formed separately from the remainder of said housing and is adhesively bonded thereto.

7. An arrester support and disconnector structure comprising an elongated body of electrical insulating material;

means at one end of said body for attachment to a mounting device so that said body lies in a general horizontal plane;

a flat, upwardly facing surface at the other end of said body for supporting an arrester;

a generally cup-shaped disconnector housing unitarily formed on said body at said other end and extending downwardly from said surface, said housing having an annular, weakened, frangible zone formed therein;

a first electrically conductive member having threaded means for electrical and mechanical connection to an arrester supported on said flat surface;

means in said housing for supporting said first member above said frangible zone;

a second electrically conductive member fixedly attached in the lower end of said housing below said frangible zone, said second member having means below said housing for connection to a ground lead; and an explosive charge positioned between said first and second members with an air gap between said charge and one of said members so that detonation of said charge fractures said housing along said zone and separates said second member and said ground lead from the remainder of said housing.

8. A structure according to claim 7 wherein the material of said body is a molded, mechanically rigid polymeric material.

9. A structure according to claim 8 wherein said means for attachment includes a flat, rigid mounting plate having a hole therethrough for receiving a threaded fastener;

a transverse wall extending upwardly from said plate; and first and second end walls joining opposite ends of said transverse wall to said plate.

10. A structure according to claim 9 wherein said second member includes a recess extending downwardly into the upper end thereof to receive said charge, said structure further including a body of electrically nonconductive material between said first member and said charge, and a cylindrical grading member surrounding said body and electrically interconnecting said first and second members.

11. A structure according to claim 7 wherein said elongated body includes means defining path-length increasing surface configurations between said one end and said other end of said body to thereby insulate the arrester and mounting device from each other.

* * * * *